(12) United States Patent
Randler et al.

(10) Patent No.: US 8,957,949 B2
(45) Date of Patent: Feb. 17, 2015

(54) ESTIMATION OF COEFFICIENTS OF FRICTION USING A 3-D CAMERA

(75) Inventors: Martin Randler, Immenstaad (DE); Stefan Heinrich, Achern (DE)

(73) Assignee: Conti Temic Microelectronic GmbH (DE)

( * ) Notice: Subject to any disclaimer, the term of this patent is extended or adjusted under 35 U.S.C. 154(b) by 0 days.

(21) Appl. No.: 13/985,092

(22) PCT Filed: Feb. 10, 2012

(86) PCT No.: PCT/DE2012/100029
§ 371 (c)(1),
(2), (4) Date: Feb. 21, 2014

(87) PCT Pub. No.: WO2012/110030
PCT Pub. Date: Aug. 23, 2012

(65) Prior Publication Data
US 2014/0267628 A1    Sep. 18, 2014

(30) Foreign Application Priority Data
Feb. 14, 2011 (DE) .......................... 10 2011 011 182

(51) Int. Cl.
*H04N 7/18*   (2006.01)
*H04N 13/02*  (2006.01)
*B60W 40/068* (2012.01)
*G06K 9/00*   (2006.01)

(52) U.S. Cl.
CPC ......... *H04N 13/0239* (2013.01); *B60W 40/068* (2013.01); *G06K 9/00791* (2013.01); *H04N 7/181* (2013.01); *B60W 2420/403* (2013.01); *B60W 2420/42* (2013.01)

USPC ............................................................ 348/47

(58) Field of Classification Search
USPC ............................................................ 348/47
See application file for complete search history.

(56) References Cited

U.S. PATENT DOCUMENTS

| 4,712,635 A | 12/1987 | Sumiya et al. |
| 2005/0172526 A1* | 8/2005 | Taylor et al. ................... 37/466 |
| 2011/0245995 A1 | 10/2011 | Schwarz |
| 2012/0078483 A1 | 3/2012 | Yajima et al. |
| 2012/0167663 A1 | 7/2012 | Groitzsch et al. |

FOREIGN PATENT DOCUMENTS

| DE | 10 2009 033 219 A1 | 7/2010 |
| EP | 0 412 791 A2 | 2/1991 |
| EP | 2 048 476 A1 | 4/2009 |
| WO | WO 2011/007015 A1 | 1/2011 |

OTHER PUBLICATIONS

International Search Report for PCT/DE2012/1000029 mailed Jan. 21, 2013.
International Preliminary Report on Patentability for PCT/DE2012/100029 dated Aug. 21, 2013.

* cited by examiner

*Primary Examiner* — Sath V Perungavoor
*Assistant Examiner* — Jeffery Williams
(74) *Attorney, Agent, or Firm* — RatnerPrestia

(57) ABSTRACT

A method and a device for estimating the coefficient of friction by a 3D camera. The 3D camera records at least one image of the vehicle's surroundings. The image data of the 3D camera is used to produce a height profile of the road surface in the entire space ahead of the vehicle. Based on the height profile, the local coefficient of friction of the road surface that is to be expected in the space ahead of the vehicle is estimated.

11 Claims, No Drawings

ESTIMATION OF COEFFICIENTS OF FRICTION USING A 3-D CAMERA

CROSS REFERENCE TO RELATED APPLICATIONS

This application is the U.S. National Phase Application of PCT/DE2012/100029, filed Feb. 10, 2012, which claims priority to German Patent Application No. 10 2011 011 182.4, filed Feb. 14, 2011, the contents of such applications being incorporated by reference herein.

FIELD OF THE INVENTION

The invention relates to a method and a device for estimating the coefficient of friction by means of a (spatial resolution) 3D camera.

BACKGROUND OF THE INVENTION

DE 102009033219 A1, which is incorporated by reference, shows a method and a device for determining a road profile of a traffic lane ahead of a vehicle. An image capture device or the vehicle's own motion data is used to determine a road height profile of the traffic lane ahead of the vehicle. Herein the image capture device can be a camera which is fixedly arranged in the front area of the vehicle and comprises two image recording units. Depending on the determined road height profile, an active chassis control or adaptive dampening system can be controlled.

Accident prevention is an increasingly important purpose of driver assistance systems. In particular emergency braking systems make a major contribution in this regard. Their effectiveness, however, depends very much on the coefficient of friction between the road surface and the tyre of the vehicle. In particular in wet conditions the coefficient of friction is much lower than that on a dry road.

WO 2011/007015 A1, which is incorporated by reference, shows a laser-based method for classifying coefficients of friction in motor vehicles. To this end, signals of a Lidar or CV sensor, which are directed towards the road surface, are evaluated and in particular the amplitude found in this way is used to determine a coefficient of friction for the measured road surface. For example it can be estimated whether the road surface is made of snow, asphalt or ice.

It has shown that state-of-the-art methods for determining the coefficient of friction involve drawbacks: additional Lidar sensors are expensive, the Lidar sensor in the vehicle must be specifically directed towards the road, and the coefficient of friction of the road cannot be estimated sufficiently in advance.

SUMMARY OF THE INVENTION

An aspect of the present invention is to eliminate these drawbacks and to enable a more economical, more reliable and foresighted estimation of the coefficient of friction.

This aspect is achieved by recording at least one image of the vehicle's surroundings by means of a 3D camera. The image data of the 3D camera is used to measure or produce a height profile of the road surface in the entire space ahead of the vehicle. Based on the height profile, the coefficient of friction (of the road surface in the space ahead of the vehicle) can be predicted. Optionally special 3D patterns can be evaluated for this purpose.

DETAILED DESCRIPTION OF THE INVENTION

In an advantageous embodiment, it is deduced from the height profile of the road surface that areas covered with water are present if there are reflections on the road. Reflections due to a water film or a puddle can be categorized as areas which are lower than the real road surface in the height profile. This can be clearly seen in the height profile.

Preferably, it is deduced from the height profile that a snow cover is present if there are lower tracks made by the tyres of vehicles travelling ahead. In addition, information from 2D image data, in particular of a greyscale image, of at least one monocular camera of the 3D camera is taken into account.

In a preferred embodiment, it is deduced from the height profile that a gravel cover is present, based on a strong noise in cross-sections of the height profile.

In addition to the height profile, 2D image data of at least one monocular camera of the 3D camera can advantageously be evaluated, in particular by means of edge detection methods, to support the information deduced from the height profile.

An aspect of the invention further relates to a device for estimating the coefficient of friction, which comprises a 3D camera for recording at least one image of the vehicle's surroundings. Said device includes evaluation means for producing a height profile of the road surface in the entire space ahead of the vehicle on the basis of image data of the 3D camera and for estimating the local coefficient of friction of the road surface that is to be expected from the height profile.

The 3D camera is preferably a stereo camera or a photonic mixing device camera or a PMD sensor.

The invention will now be explained in more detail with reference to an exemplary embodiment.

A stereo camera records at least one image of the surroundings ahead of the vehicle, which is then used to produce a height profile of the road. The analysis of this height profile shows for example that there are two depressions extending in the direction of travel, whose dimension in the transverse direction is approximately the width of a tyre and whose transverse distance is approximately the width of a vehicle, e.g. 1.5 meters. This finding can be used for a classification suggesting a snow cover or an unpaved road surface (e.g. a muddy track through the fields). A 2D camera image of an image recording unit of the stereo camera can be analyzed to determine whether the road surface is white or seems to be darker. In the first case it is determined that the road surface is made of snow, otherwise an unpaved road surface is assumed. This finding can be used to estimate the coefficient of friction for the relevant road surface, e.g. $\mu_H < 0.2$ for snow and approx. 0.2 to 0.3 for a track through the fields.

The invention claimed is:

1. A method for estimating the coefficient of friction by means of a 3D camera, wherein the 3D camera records at least one image of the surroundings ahead of the vehicle, and wherein the image data of the 3D camera is used to produce a height profile of the road surface in the entire space ahead of the vehicle and the height profile is used to estimate the local coefficient of friction of the road surface that is to be expected in the space ahead of the vehicle.

2. The method according to claim 1, wherein it is deduced from the height profile of the road surface that areas covered with water are present if there are reflections on the road, due to the fact that reflections can be categorized as areas which are lower than the real road surface in the height profile.

3. The method according to claim 1, wherein it is deduced from the height profile that a snow cover is present if there are lower tracks made by the tyres of vehicles travelling ahead and additionally taking into account information from 2D image data of at least one monocular camera of the 3D camera.

4. The method according to claim 1, wherein it is deduced from the height profile that a gravel cover is present, based on a noise in cross-sections of the height profile.

5. The method according to claim 1, wherein in addition 2D image data of at least one monocular camera of the 3D camera are evaluated, by edge detection methods, to support the information deduced from the height profile.

6. The method according to claim 1, wherein the 3D camera is a stereo camera.

7. The method according to claim 1, wherein the 3D camera is a photonic mixing device camera.

8. A device for estimating the coefficient of friction, comprising a 3D camera for recording at least one image of the surroundings ahead of the vehicle, wherein evaluation means are provided for producing a height profile of the road surface in the entire space ahead of the vehicle on the basis of image data of the 3D camera and for estimating the local coefficient of friction of the road surface that is to be expected from the height profile.

9. The device according to claim 8, wherein the 3D camera is a stereo camera.

10. The device according to claim 8, wherein the 3D camera is a photonic mixing device camera.

11. The method according to claim 1, wherein the 2D image is a greyscale image.

* * * * *